United States Patent Office 3,058,955
Patented Oct. 16, 1962

3,058,955
POLYURETHANE PLASTICS
Wolfram Neumann and Otto Bayer, Leverkusen, Germany, assignors to Farbenfabriken Bayer Aktiengesellschaft, Leverkusen, Germany, a corporation of Germany
No Drawing. Filed July 13, 1960, Ser. No. 42,474
Claims priority, application Germany July 29, 1959
11 Claims. (Cl. 260—77.5)

This invention relates to polyurethane plastics and a process for the preparation thereof. More particularly this invention is concerned with the production of light-stable polyurethane plastics.

The production of polyurethane plastics by the reaction of active hydrogen containing compounds and organic polyisocyanates is well known. Many of these compounds suffer from the disadvantage that they turn yellow when exposed to sunlight or even to artificial light.

It is also known to produce coating compositions and the like from the adduct of three mols of an organic diisocyanate with one mol of a trihydric alcohol. These and similar adducts are soluble in polar solvents which are free of hydroxyl groups such as ethyl acetate and the like. These organic solvent solutions may be coated onto substrates and cured to form a high-grade coating. To some extent the adducts may be mixed with nonpolar solvents such as benzene, toluene, xylene or the like. However, most of the products are so insoluble in the nonpolar solvents that they cannot be used for the production of coating compositions.

It is, therefore, an object of this invention to provide improved polyurethane plastics which are substantially devoid of the above-described disadvantages. Another object of this invention is to provide an improved process for the preparation of polyurethane plastics which are soluble in nonpolar solvents and which may be used for the production of improved coating compositions which are substantially insensitive to the action of light.

The foregoing objects and others which will become apparent from the following description are accomplished in accordance with the invention, generally speaking, by providing polyurethane plastics which are substantially insensitive to the action of light and which are obtained from 1,3-diisopropyl benzene-4,6-diisocyanate or adducts thereof and an organic compound containing at least two active hydrogen containing groups as determined by the Zerewitinoff method and having a molecular weight of at least about 500. In accordance with a preferred embodiment of this invention 1,3-diisopropyl benzene-4,6-diisocyanate is reacted with less than enough of a polyhydric alcohol which preferably contains two or three hydroxyl groups in a first step to prepare an adduct which is completely soluble in nonpolar solvents such as benzene, toluene, xylene, aliphatic hydrocarbons, petroleum ether, gasoline, mineral spirits and the like. The soluble adduct is then cured on a suitable substrate to provide an improved coating which is substantially insensitive to the action of light.

The adduct may be prepared by simply combining an excess of the diisocyanate with a polyhydric alcohol preferably in the molar ratios which correspond to about two —NCO groups for each hydroxyl group and preferably those having a molecular weight below about 500. Any dihydric, trihydric or higher alcohol may be used such as, for example, propylene glycol, butylene glycol, trimethylol propane, trimethylol hexane, 1,2,6-hexane triol, polypropylene glycols having a molecular weight of about 200 to about 440 and the like. It is particularly desirable to use a mixture of dihydric and trihydric alcohols such as a mixture of trimethylol propane and 1,4-butane diol. The adducts which are most easily dissolved in nonpolar organic solvents are obtained by reacting an excess of 1,3-diisopropyl benzene-4,6-diisocyanate with 2-ethyl hexane diol-1,3-octadecane-1,12-diol, octadecene-1,10-diol-1,12 and castor oil.

It is possible to use other organic polyisocyanates in conjunction with the 1,3-diisopropyl benzene-4,6-diisocyanate. However, where mixtures are used there should always be at least one part of the 1,3-diisopropyl benzene-4,6-diisocyanate present for each part of the additional different polyisocyanate used. The additional organic polyisocyanate may be any suitable organic polyisocyanate including aliphatic, aromatic, cycloaliphatic, and heterocyclic polyisocyanates such as, for example, hexamethylene diisocyanate, ethylene diisocyanate, 2,4-toluylene diisocyanate, 2,6-toluylene diisocyanate, isopropyl benzene-2,4-diisocyanate, furfurylidene diisocyanate, 1,4-cyclohexane diisocyanate and the like.

In the production of the adducts of the invention it is often advantageous to employ continuous distillation as by throughflow or thin-film evaporators such as the so-called falling-film evaporators for the production of the adducts of the invention so that the product is only exposed to a high temperature for a relatively short period of time.

Any suitable organic compound containing at least two active hydrogen containing groups as determined by the Zerewitinoff method and having a molecular weight of at least about 500 may be used for reaction with either the 1,3-diisopropyl benzene-4,6-diisocyanate per se or with the —NCO terminated polyhydric alcohol adduct thereof to prepare the improved polyurethane plastic of the invention. The active hydrogen atoms are usually attached to oxygen, nitrogen or sulphur atoms. Thus, suitable active hydrogen containing groups as determined by the Zerewitinoff method which are reactive with isocyanate groups include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups should be at least about 500. Preferably, however, at least one of the organic compounds containing at least two active hydrogen containing groups which is used in the production of the polyurethane plastic has a molecular weight between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the 1,3-diisopropyl benzene-4,6-diisocyanate or adduct thereof can be obtained.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic, α-butyl-α-ethyl-glutaric acid, α-β-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257-262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexanediol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexane triol, 1,3,7-heptane triol, 1,4,8-octane triol, 1,6,12-dodecane triol and the like; alkene triols such as, 1-hexene-1,3,6-triol and the like; alkyne triols such as, 2-hexyne-1,3,6-triol and the like; alkane tetrols such as, for example, 1,2,5,6-hexane tetrol and the like; alkene tetrols such as, for example 3-heptene-1,2,6,7- tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino 5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N' - tetrakis(2-hydroxypropyl)ethylene diamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

It is preferred to employ an organic compound which may be blended satisfactorily with the nonpolar solvents such as those more particularly set out above.

The production of sheet-like structures, such as, for example, films, foils, coatings, adhesive layers, linings, primer coatings and the like, is carried out by simply combining the 1,3-diisopropyl benzene-4,6-diisocyanate or —NCO terminated adduct thereof with an organic compound containing active hydrogen containing groups in approximately equivalent proportions preferably so that the number of —NCO groups present is approximately equal to the number of hydroxyl groups present. The mixtures are then applied to a substrate, where they react with one another at room temperature or if desired, at elevated temperatures to produce a hard solvent-resistant, light-fast polyurethane plastic. Either the isocyanate or active hydrogen containing compound may be present in considerable excess.

The heretofore known methods of accelerating the reaction by using activators or of impeding the reaction by retarding agents may be used without deleteriously affecting the product. Additives, such as fillers, organic and inorganic pigments, metal powders, dyestuffs, plasticizers and the like can be concurrently used in the normal manner.

The good solubility in nonpolar solvents is surprising and was not to be anticipated, since reaction products of aliphatic, hydroaromatic and aromatic diisocyanates, such as, for example, tetramethylene diisocyanate, hexamethylene diisocyanate, toluylene-2,4-diisocyanate, toluylene-2,6-diisocyanate, isopropyl benzene-2,4-diisocyanate, diphenyl methane-4,4'-diisocyanate with polyalcohols do not show any appreciable solubility in nonpolar solvents.

The use of hydrocarbons as solvents for these adducts is important because in comparison with the polar solvents, such as acetic ester, butyl acetate, ethylene glycol monoethyl ether acetate, acetone and the like, the nonpolar solvents contain practically no water or other compounds capable of reacting with isocyanate groups. For this reason, when using benzene as solvent, the purification thereof prior to combination with the isocyanate becomes superfluous. In addition, the higher hydrocarbon fractions, which are usually used as lacquer solvents in the form of white spirit, have a longer evaporation time and a higher flash point than the esters, such as acetic ester or butyl acetate which are normally employed. Another advantage on economic grounds is the use of hydrocarbons instead of the usual low-boiling solvents, such as ethyl acetate, which cannot be readily employed in countries where the climate is hot.

The products of the invention are, therefore, particularly useful for the preparation of coating compositions as well as castings and moldings which are substantially insensitive to the action of light and which exhibit a high degree of solubility in nonpolar organic solvents. Thus, coatings for the exterior of buildings, gear wheels and the like may be prepared.

The invention is further illustrated by the following examples in which the parts are by weight unless otherwise indicated.

*Example 1*

About 142 parts of octa-9,10-decene-1,12-diol are gradually added at about 80 to about 100° C. to a solution of about 244 parts of 1,3-diisopropyl benzene-4,6-diisocyanate (B.P.=128° C./1 mm.; M.P. 59 to 61° C.) in about 129 parts of white spirit. The mixture is then stirred for a few hours at about 80° C. The oily almost colorless solution has an isocyanate content of about 7.6 percent.

About 55.2 parts of the above polyisocyanate solution are added to about 82.6 parts of about a 40 percent solution in toluene of a polyhydroxy compound obtained from about 444 parts of phthalic anhydride, about 1584 parts of castor oil and about 330 parts of pentaerythritol, the same compound having an acid number of about 0.9 and an hydroxyl content of about 5.3 percent. The solution is adjusted to a solid content of about 50 percent with about 10.8 parts of white spirit. The films produced with this mixture are clear and elastic after drying for three hours at about 80° C.

*Example 2*

About 244 parts of 1,3-diisopropyl benzene-4,6-diisocyanate are reacted with about 73 parts of 2-ethyl-hexane-1,3-diol, as described in Example 1. Using about 106 parts of white spirit, about a 75 percent solution is prepared which has an isocyanate content of about 9.3 percent.

About 45.1 parts of this polyisocyanate solution are mixed with about 82.6 parts of about a 40 percent solution of polyhydroxy compound in toluene, as described in Example 1, and is adjusted to about a 50 percent solid content by adding about 5.3 parts of white spirit. The films prepared therefrom and dried for about 3 hours at about 80° C. are clear, resistant to scratching and elastic.

*Example 3*

A mixture of about 22.4 parts of hexane-1,2,6-triol and about 36.5 parts of 2-ethyl-hexane-1,3-diol are reacted as described in Example 1 with about 244 parts of 1,3-diisopropyl benzene-4,6-diisocyanate in about 102 parts of white spirit, isocyanate content about 9.84 percent.

About 43 parts of this solution are mixed with about 36.8 parts of about a 40 percent solution of polyhydroxy compound in toluene, the said compound having been prepared from about 280 parts of ricinoleic acid and about 135 parts of trimethylol propane and having an acid number of about 1.9 and an hydroxyl content of about 11.6, and the solid content is adjusted to about 50 percent with another about 5.5 parts of white spirit. Coatings prepared with this mixture are dried for about 2 hours at about 80° C. and clear, highly elastic sheet formations are formed.

*Example 4*

A mixture of about 31.5 parts of trimethylol propane and about 106 parts of castor oil are reacted as described in Example 1 with about 244 parts of 1,3-diisopropyl benzene-4,6-diiocyanate in about 127 parts of white spirit. The solution has an isocyanate content of about 7.2 percent.

About 58.2 parts of this solution are mixed with about 70 parts of about a 40 percent solution of polyhydroxy compound in toluene, the said compound consisting of about 462 parts of hexahydrophthalic anhydride, about 405 parts of trimethylol propane and about 1056 parts of castor oil, with an acid number of about 3.6 and an hydroxyl content of about 6 percent. About 24.8 parts of white spirit are added to this mixture and thereby the solid content is adjusted to about 50 percent. Films from this mixture are dust-dry and clear after about 3 to about 4 hours at room temperature.

*Example 5*

About 336 parts of castor oil are reacted as described in Example 1 with about 244 parts of 1,3-diisopropyl benzene-4,6-diisocyanate. By adding about 196 parts of white spirit, about a 75 percent solution is obtained with about 5.1 percent isocyanate.

The solution is applied to form a film and left for a few hours at about 80° C. in a water-vapor atmosphere. A clear highly elastic film is formed, which is insoluble in organic solvents.

*Example 6*

A mixture of about 106 parts of castor oil and about 41.1 parts of trimethylol hexane are added as described in Example 1 to a mixture of about 244 parts of 1,3-diisopropyl benzene-4,6-diisocyanate and about 97.6 parts of white spirit. The viscous light yellow solution has an isocyanate content of about 8.0 percent.

About 52.5 parts of this solution are mixed with about 70 parts of about a 40 percent solution of polyhydroxy compound in toluene, as described in Example 4. About another 12.1 parts of washing benzine are added and thus a solid content of about 50 percent is adjusted. Coatings of this mixture are dried at about 80° C. for about 2 hours in a drying chamber and produce clear elastic films.

*Example 7*

About 352 parts of castor oil are reacted as described in Example 1 with a mixture of about 122 parts of 1,3-diisopropyl benzene-4,6-diisocyanate and about 84 parts of hexamethylene diisocyanate in about 186 parts of white spirit. The —NCO content is about 5.36 percent.

About 78.4 parts of this solution are mixed with about 70 parts of about a 40 percent solution of polyhydroxy compound in xylene, as described in Example 4, and about 24.8 parts of a hydrocarbon mixture with the boiling limits about 160 to about 190° C. are added. A clear solution is formed which has a solid content of about 50 percent. Coatings dried for about 3 to about 4 hours at about 80° C. produce clear elastic films.

*Example 8*

About 352 parts of castor oil are added as described in Example 1 to a mixture of about 122 parts of 1,3-diisopropyl benzene-4,6-diisocyanate and about 87 parts of toluylene diisocyanate. About a 75 percent solution with an isocyanate content of about 4.65 percent is produced with about 187 parts of white spirit.

About 90 parts of this solution are mixed with about 70 parts of the approximate 40 percent solution of a polyhydroxy compound as described in Example 4 and blended with another about 31.0 parts of white spirit to give a solid content of about 50 percent. Coatings of this mixture, dried at about 80° C. for about 3 to about 4 hours, produce clear films.

*Example 9*

A mixture of about 42.6 parts of octa-9,10-decene-1,12-diol and about 41.1 parts of trimethylol hexane are reacted as described in Example 1 with about 244 parts of 1,3-diisopropyl benzene-4,6-diisocyanate in about 145 parts of white spirit. About 108 parts of m-cresol are added dropwise thereto at about 100° C. over a period of about 2 hours and the mixture is stirred for another hour. The isocyanate content of the solution is about 6.4 percent (sum of free isocyanate groups and isocyanate groups masked with m-cresol).

About 65.6 parts of this solution and about 82.6 parts of about a 40 percent solution of polyhydroxy compound in toluene are mixed as described in Example 1. A clear solution is formed which, when applied to a support, produces a clear hard film after drying for about 2 hours at about 180 to about 200° C.

It is to be understood that any other suitable organic compound containing at least two active hydrogen containing groups as determined by the Zerewitinoff method, organic solvent or the like could have been used in the foregoing examples with satisfactory results if the procedures set forth in the disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A process for the preparation of polyurethane plastics which are substantially insensitive to the action of light which comprises reacting 1,3-diisopropyl benzene-4,6-diisocyanate with an organic compound containing at least two active hydrogen containing groups as determined by the Zerewitinoff method and having a molecular weight above about 500.
2. The product of the process of claim 1.
3. A process for the production of polyurethane plastics which are substantially insensitive to the action of light which comprises reacting 1,3-diisopropyl benzene-4,6-diisocyanate with a polyhydric polyalkylene ether having a molecular weight of at least about 500.
4. The product of the process of claim 3.
5. A process for the production of polyurethane plastics which are substantially insensitive to the action of light which comprises reacting 1,3-diisopropyl benzene-4,6-diisocyanate with an hydroxyl polyester obtained from a polycarboxylic acid and an excess of a polyhydric alcohol.
6. The product of the process of claim 5.
7. A process for the production of polyurethane plastics which are substantially insensitive to the action of light which comprises reacting 1,3-diisopropyl benzene-4,6-diisocyanate with a polyhydric polythioether.
8. A polyurethane adduct which is soluble in nonpolar solvents which comprises the reaction product of an excess of 1,3-diisopropyl benzene-4,6-diisocyanate with a polyhydric alcohol having a molecular weight below about 500.
9. A coating composition which comprises a nonpolar organic solvent solution of a polyurethane prepared by a process which comprises reacting 1,3-diisopropyl benzene-4,6-diisocyanate with an organic compound containing at least two active hydrogen containing groups as determined by the Zerewitinoff method and having a molecular weight of at least about 500.
10. The coating composition of claim 9 wherein said nonpolar solvent is toluene.
11. The coating composition of claim 9 wherein said nonpolar solvent is mineral spirits.

References Cited in the file of this patent

Angewandte Chemie, September 1947, No. 9, by Dr. Otto Bayer, pages 257–268.

Siefkin, Liebigs Annalen der Chemie, vol. 562 (1949), pages 121–136.

Arnold et al., Journal of Chemical Education, vol. 34, No. 4, April 1957, pages 158–165.